Oct. 14, 1958 L. L. BURNS, JR 2,856,588

MECHANICAL FILTER

Filed March 1, 1956

INVENTOR.
LESLIE L. BURNS, JR

BY Charles H. Brown

ATTORNEY

United States Patent Office 2,856,588

Patented Oct. 14, 1958

2,856,588

MECHANICAL FILTER

Leslie L. Burns, Jr., Princeton, N. J., assignor to Radio Corporation of America, a corporation of Delaware Application March 1, 1956, Serial No. 568,928

16 Claims. (Cl. 333—71)

The invention relates to mechanical filters, and particularly to mechanical filters having parallel resonators.

An object of the invention is to provide a novel mechanical filter, the frequency response curve of which is characterized by steep leading and trailing edges.

Another object of the invention is to provide a novel mechanical filter having properties similar to a lattice network.

These and other objects are realized in accordance with the invention by the combination of at least one direct resonator and at least one contrary resonator connected in parallel between input and output resonators. The direct resonator has a length substantially equal to some integral multiple of a half wavelength at the resonant frequency of the direct resonator. The contrary resonator is longer than the direct resonator by an amount substantially equal to an odd integral multiple of a half wavelength at the resonant frequency of the contrary resonator. Signals are applied to the input resonator and are coupled by the direct and contrary resonators to the output resonator. Signals transmitted through the combination of resonators are filtered as though they had been transmitted through an equivalent lattice network.

The invention is explained in detail in connection with the accompanying drawing, in which.

Figures 1, 2, 4:
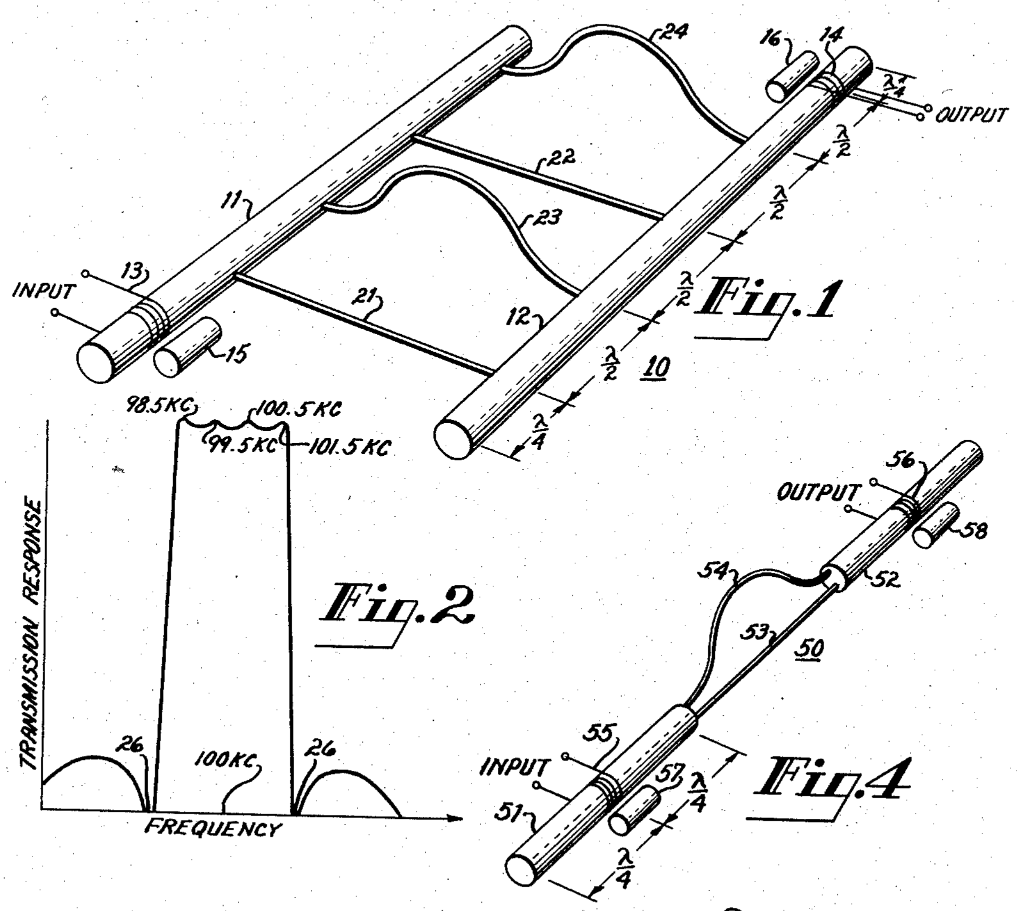
Fig. 1 shows a mechanical filter in accordance with one embodiment of the invention.
Fig. 2 shows a frequency response curve obtained from the filter shown in Fig. 1.
Figs. 3 and 4 show two other embodiments in accordance with the invention.

In Fig. 1 there is shown a mechanical filter 10 comprising a cylindrically shaped input resonator 11 and a similar output resonator 12. The input and output resonators 11, 12 are substantially physically parallel to each other and are made of some magnetostrictive material (such as nickel) or some non-magnetostrictive material (such as steel) which is coated with a magnetostrictive material in a manner taught by applicant in his U. S. Patent No. 2,619,604. An input coil 13 is coupled to one end of the input resonator 11, and an output coil 14 is coupled to one end of the output resonator 12. The input and output coils 13, 14 are preferably placed at opposite ends of the input and output resonators 11, 12 respectively, so as to eliminate direct coupling between the input and output coils 13, 14. Biasing means are also provided for biasing the same ends respectively of the input and output resonators 11, 12. If the input and output resonators 11, 12 are to operate in the longitudinal mode, the biasing means may comprise bias magnets 15, 16 positioned as shown so that longitudinal flux is set up in the input and output resonators 11, 12. If the input and output resonators 11, 12 are to operate in the torsional mode, the biasing means should provide circular bias in the resonators 11, 12. The input and output resonators 11, 12 are designed so that their resonant frequency in the desired mode of vibration is the midband frequency of the filter 10. The length of the input and output resonators 11, 12 is determined by the number of direct and contrary resonators that are used, as will be explained.

The input and output resonators 11, 12 are coupled together by a plurality of rod-shaped direct resonators 21, 22 and a plurality of rod-shaped contrary resonators 23, 24. These direct and contrary resonators 21, 22, 23, 24 are made of some material (such as copper wire) that is capable of transmitting mechanical vibrations. While only two direct resonators 21, 22 and only two contrary resonators 23, 24 are shown in Fig. 1, any number may be used as long as the difference between the number of direct resonators and the number of contrary resonators is not greater than one. In order that the proper passband is provided, the direct and contrary resonators must each be tuned to a different frequency within the desired passband. Furthermore, it is necessary that the resonator frequencies of the direct resonators and the resonant frequencies of the contrary resonators alternate with each other. In Fig. 1, each of the direct resonators 21, 22 has a length substantially equal to an integral multiple of half wavelengths at the resonant frequency of the particular direct resonator. Each of the contrary resonators 23, 24 is longer than the direct resonators 21, 22 by an amount substantially equal to an odd integral multiple, including unity, of a half wavelength at the resonant frequency of the particular contrary resonator. The direct and contrary resonators 21, 22, 23, 24 may be positioned in any physical sequence, and are preferably fastened at right angles along the length of the input and output resonators 11, 12. The direct and contrary resonators 21, 22, 23, 24 may be fastened by soldering or welding them in radial holes in the input and output resonators 11, 12. The direct and contrary resonators 21, 22, 23, 24 may be spaced apart by a distance substantially equal to any integral multiple of a half wavelength at the midband frequency of the filter 10. These distances need not all be the same so long as the distance around a path comprising any pair of direct and contrary resonators having adjacent resonant frequencies and the lengths of the input and output resonators between the points of mounting of any such pair of direct and contrary resonators is some odd integral multiple, including unity, of a half wavelength at the midband frequency of the filter 10. The input and output coils 13, 14 should be separated from the nearest direct or contrary resonator by some distance substantially equal to an integral multiple of a half wavelength at the midband frequency of the filter 10. Also, the input and output coils 13, 14 should be separated from the nearest ends of their respective input and output resonators 11, 12 by a distance substantially equal to an odd integral multiple, including unity, of a quarter wavelength at the midband frequency of the filter 10, if the free end type of arrangement shown is to be used. And at the other end of the input and output resonators 11, 12, the input and output resonators 11, 12 should extend beyond the last direct or contrary resonator, as the case may be, by a distance substantially equal to some odd integral multiple, including unity, of a quarter wavelength at the midband frequency of the filter 10, if the free end type of arrangement shown is to be used.

As an illustrative example of the design values for the filter 10 shown in Fig. 1, it is assumed that the filter 10 is to have a passband of 3 kilocycles (kc.) centered about a midband frequency of 100 kc. The direct resonators 21, 22 might then have resonant frequencies of 98.5 kc. and 100.5 kc. respectively, and the contrary resonators 23, 24 would then have resonant frequencies of 99.5 kc. and 101.5 kc. respectively. If the direct resonators 21, 22 were made one half wavelength long at their respective resonant frequencies, then the contrary resonators 23, 24 might then be made two half wavelengths long at their respective resonant frequencies. The direct and contrary resonators 21, 22, 23, 24 are shown separated from one another and from their respective input and output coils 13, 14 by a half wavelength at 100 kc.

If the filter 10 shown in Fig. 1 is designed to operate in the longitudinal mode, signals applied to the input coil 13 cause the input resonator 11 to vibrate in the longitudinal mode. Longitudinal vibrations of the input resonator 11 cause the direct and contrary resonators to vibrate in the longitudinal mode because of Poisson's ratio effect, and these vibrations cause the output resonator 12 to vibrate in the longitudinal mode because of Poisson's ratio effect also. The longitudinal vibrations of the output resonator 12 are detected by the output coil 14. If the filter 10 shown in Fig. 1 is designed to operate in the torsional mode the biasing means would be changed so as to provide circular bias in the input and output resonators 11, 12. The applied signals would then cause the input resonator 11 to vibrate in the torsional mode. These torsional vibrations also cause the direct and contrary resonators to vibrate in the torsional mode, and these vibrations cause the output resonator 12 to vibrate in the torsional mode. The torsional vibrations of the output resonator 12 are detected by the output coil 14.

A transmission response curve for the filter 10 shown in Fig. 1 is shown in Fig. 2. The frequency values assumed in the illustrative example are indicated in Fig. 2, where it will be noted that the resonant frequency of each of the direct and contrary resonators 21, 22, 23, 24 appears as a peak in the passband of the filter 10. It will be noted that the selectivity of the filter 10 is improved by the rejection points 26. These rejection points 26 result from cancellation of the transmissions through the direct resonators by out-of-phase transmission through the contrary resonators. This cancellation effect is characteristic of lattice type filters, of which this filter is a mechanical equivalent.

Figure 3:
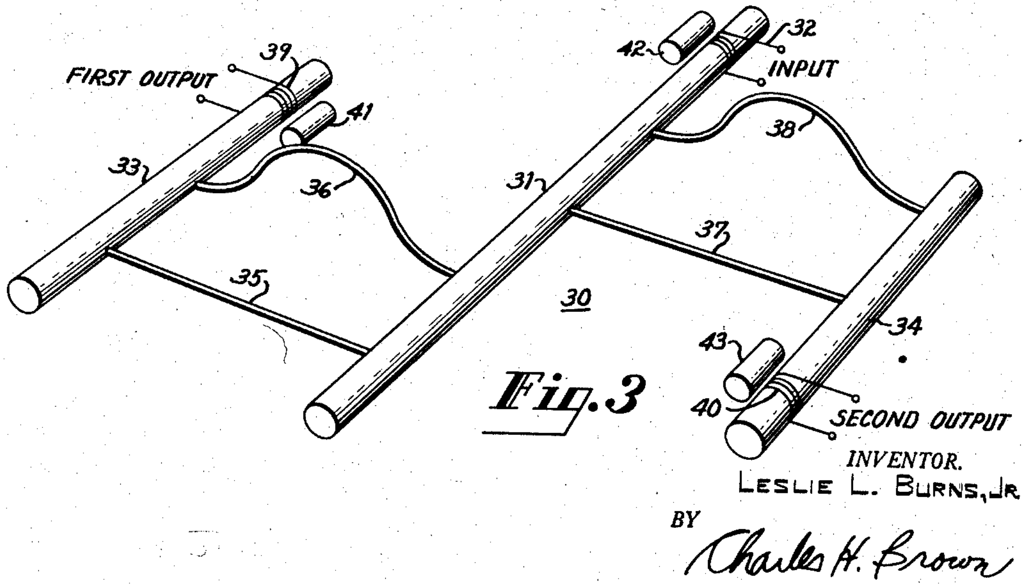

Another embodiment of the invention, in the form of a branching filter 30, is shown in Fig. 3. The branching filter 30 comprises a cylindrical input resonator 31 to which an input coil 32 is coupled. First and second cylindrical output resonators 33, 34 are coupled to the input resonator 31 through rod-shaped direct and contrary pairs of resonators 35, 36 and 37, 38 in the same manner as the filter 10 shown in Fig. 1. First and second output coils 39, 40 are coupled to the output resonators 33, 34 respectively. Appropriate biasing means, such as the biasing magnets 41, 42, 43, are also provided. The input resonator 31 is tuned to the mean of the two bands of input frequencies, which are applied to the input coil 32. The first output resonator 33 is tuned to the midband frequency of one of the two bands of input frequencies and the second output resonator 34 is tuned to the midband frequency of the other of the bands of input frequencies. These two bands of frequencies are derived from the first and second output coils 39, 40 respectively. The various elements of the branching filter 30 may be designed in the same manner as the elements of the filter 10 shown in Fig. 1, taking the frequencies involved into consideration. If the direct and contrary pairs of resonators 35, 36 and 37, 38 are connected to the input resonator 31 as shown in Fig. 3, the particular direct or contrary resonator coupled to the first output resonator 33 should be separated from the nearest particular direct or contrary resonator coupled to the second output resonator 34 by a distance substantially equal to an integral number of half wavelengths at the mean frequency. However, the direct and contrary resonators 35, 36 coupled to the first output resonator and the direct and contrary resonators 37, 38 coupled to the second output resonator 34 may be positioned at any points along the length of the input resonator 31 as long as all direct and contrary resonators are spaced an integral multiple of half wavelengths from the input coil 32. The operation of the branching filter 30 may be reversed so that it serves as a mixing filter by applying separate bands of frequencies to the two output coils 39, 40 and deriving the two bands of frequencies from the input coil 32.

Still another embodiment of the invention, in the form of a composite filter 50, is shown in Fig. 4. The composite filter 50 comprises a cylindrical input resonator 51 and a cylindrical output resonator 52. One end of the input resonator 51 is coupled to one end of the output resonator 52 by a rod-shaped direct resonator 53 and a rod-shaped contrary resonator 54. An input coil 55 and an output coil 56 are coupled to the other ends respectively of the input and output resonators 51, 52 and biasing means, such as the bias magnets 57, 58 are provided for supplying the input and output resonators 51, 52 with longitudinal magnetic bias flux. The embodiment shown in Fig. 4 cannot operate in the torsional mode. More cylindrical resonators and direct and contrary resonators may be used to provide a chain of cylindrical resonators interconnected at their ends by direct and contrary resonators. Because of the limited area of the ends of the cylindrical resonators, it is probably feasible to use only one direct and one contrary resonator to couple adjacent cylindrical resonators. The various elements of the composite filter 50 shown in Fig. 4 may also be designed in the same manner as the elements of the filter 10 shown in Fig. 1.

A filter in accordance with the invention and similar to Fig. 1 was successfully constructed and operated at a mid-band frequency of 92 kc. The input and output resonators were made of 3/16 inch diameter nickel plated brass rods and were three half wavelengths long (2 3/16 inches). The direct and contrary resonators were made of 0.04 inch copper wire and were five half wavelengths (3.625 inches) and six half wavelengths (4.35 inches) long respectively.

Mechanical filters constructed in accordance with the invention have several advantages over the conventional ladder or series type of mechanical filter. It is relatively easy to adjust the tuning of the various direct and contrary resonators, an advantage that is particularly helpful in applications requiring a filter having a large number of resonators. This is because it is easy to clamp the other direct and contrary resonators while one is being tuned. Also, a filter having the parallel resonators is more flexible than the conventional ladder type of mechanical filter. The filter having the parallel resonators is a mechanical realization of a lattice network, and this provides the most general form of coupling between two pairs of terminals. Thus, for instance, the filter can be designed to approximate a linear phase constant amplitude characteristic in a band of frequencies. Furthermore, since the filter is equivalent to a lattice network, it is possible to apply known methods of lattice design to achieve the desired electrical characteristics.

I claim:

1. A mechanical resonator device, comprising a mechanically vibratory input resonator, a mechanically vibratory output resonator, at least one mechanically vibratory direct resonator coupled between said input and said output resonators, and at least one mechanically vibratory contrary resonator coupled between said input and said output resonators, said contrary resonator having a length longer than the length of said direct resonator by an amount substantially equal to an odd integral multiple, including unity, of a half wavelength at the resonant frequency of said contrary resonator.

2. A mechanical filter, comprising a mechanically vibratory input resonator, a mechanically vibratory output resonator, at least one mechanically vibratory direct resonator coupled at its ends between said input and said output resonators, and at least one mechanically vibratory contrary resonator coupled at its ends between said input and said output resonators, said contrary resonator having a length longer than the length of said direct resonator by an amount substantially equal to an odd integral multiple, including unity, of a half wavelength at the resonant frequency of said contrary resonator.

3. A mechanical filter, comprising a mechanically vibratory input resonator, a mechanically vibratory output resonator, at least one mechanically vibratory direct resonator having a length that is substantially equal to D half wavelengths at the resonant frequency of said direct resonator, where D is any integer including unity, at least one mechanically vibratory contrary resonator having a length that is substantially equal to (D+C) half wavelengths at the resonant frequency of said contrary resonator, where C is any odd integer including unity, and means for coupling said direct and said contrary resonators in parallel between said input and said output resonators.

4. A mechanical filter, comprising a mechanically vibratory input resonator, a mechanically vibratory output resonator, at least one mechanically vibratory direct resonator coupled between said input and said output resonators at respective points thereon, and at least one mechanically vibratory contrary resonator coupled between said input and said output resonators at respective points thereon that are respectively separated by a distance substantially equal to some integral multiple, including unity, of a half wavelength at the midband frequency of said filter from said respective points at which said direct resonator is coupled, said contrary resonator having a length longer than the length of said direct resonator by an amount substantially equal to an odd integral multiple, including unity, of a half wavelength at the resonant frequency of said contrary resonator.

5. A mechanical filter, comprising a mechanically vibratory input resonator, a mechanically vibratory output resonator, at least one mechanically vibratory direct resonator having a length that is substantially equal to D half wavelengths at the resonant frequency of said direct resonator, where D is any integer including unity, at least one mechanically vibratory contrary resonator having a length that is substantially equal to (D+C) half wavelengths at the resonant frequency of said contrary resonator, where C is any odd integer including unity, means for coupling one end of said direct resonator and one end of said contrary resonator to said input resonator at respective points thereon that are separated by a distance substantially equal to L half wavelengths at the midband frequency of said filter, where L is any integer including unity, and means for coupling the other end of said direct resonator and the other end of said contrary resonator to said output resonator at respective points thereon that are separated by a distance substantially equal to L half wavelengths at the midband frequency of said filter.

6. A mechanical filter, comprising a mechanically vibratory input resonator, a mechanically vibratory output resonator, at least one mechanically vibratory direct resonator having a length that is substantially equal to D half wavelengths at the resonant frequency of said direct resonator, where D is any integer including unity, at least one mechanically vibratory contrary resonator having a length that is substantially equal to (D+C) half wavelengths at the resonant frequency of said contrary resonator, where C is any odd integer including unity, said resonant frequency of said direct resonator being different from said resonant frequency of said contrary resonator, means for coupling one end of said direct resonator and one end of said contrary resonator to said input resonator at respective points thereon that are separated by a distance substantially equal to L half wavelengths at the midband frequency of said filter, where L is any integer including unity, and means for coupling the other end of said direct resonator and the other end of said contrary resonator to said output resonator at respective points thereon that are separated by a distance substantially equal to L half wavelengths at the midband frequency of said filter.

7. A mechanical filter, comprising a mechanically vibratory input resonator, a mechanically vibratory output resonator, a plurality of mechanically vibratory direct resonators each having a length that is substantially equal to D half wavelengths at the resonant frequency of said direct resonator, where D is any integer including unity, a plurality of mechanically vibratory contrary resonators, the number of direct resonators and the number of contrary resonators differing by no more than one, each of said contrary resonators having a length that is substantially equal to (D+C) half wavelengths at the resonant frequency of said contrary resonator, where C is any odd integer including unity, means for coupling one end of each of said direct resonators and one end of each of said contrary resonators to said input resonator at respective points thereon that are separated by a distance substantially equal to L half wavelengths at the midband frequency of said filter, where L is any integer including unity, and means for coupling the other end of each of said direct resonators and the other end of each of said contrary resonators to said output resonator at respective points thereon that are separated by a distance substantially equal to L half wavelengths at the midband frequency of said filter.

8. A mechanical filter, comprising a mechanically vibratory input resonator, a mechanically vibratory output resonator, a plurality of mechanically vibratory direct resonators each having a length that is substantially equal to D half wavelengths at the resonant frequency of said direct resonator, where D is any integer including unity, an equal plurality of mechanically vibratory contrary resonators each having a length that is substantially equal to (D+C) half wavelengths at the resonant frequency of said contrary resonator, where C is any odd integer including unity, means for coupling one end of each of said direct resonators and one end of each of said contrary resonators to said input resonator at respective points thereon that are separated by a distance substantially equal to L half wavelengths at the midband frequency of said filter, where L is any integer including unity, and means for coupling the other end of each of said direct resonators and the other end of each of said contrary resonators to said output resonator at respective points thereon that are separated by a distance substantially equal to L half wavelengths at the midband frequency of said filter.

9. A mechanical filter, comprising a mechanically vibratory cylindrical input resonator, a mechanically vibratory cylindrical output resonator, each of said resonators being tuned to the midband frequency of said filter, a plurality of mechanically vibratory rod-shaped direct resonators each having a length that is substantially equal to D half wavelengths at the resonant frequency of said direct resonator, where D is any integer including unity, an equal plurality of mechanically vibratory rod-shaped contrary resonators each having a length that is substantially equal to (D+C) half wavelengths at the resonant frequency of said contrary resonator, where C is any odd integer including unity, means for coupling one end of each of said direct resonators and one end of each of said contrary resonators to said input resonator along the length thereof at respective points that are separated by a distance substantially equal to L half wavelengths at said midband frequency of said filter, where L is any integer including unity, and means for coupling the other end of each of said direct resonators and the other end of each of said contrary resonators to said output resonator along the length thereof at respective points thereon that are separated by a distance substantially equal to L half wavelengths at said midband frequency of said filter.

10. A mechanical filter, comprising a mechanically vibratory cylindrical input resonator, a mechanically vibratory cylindrical output resonator, each of said resonators being tuned to the midband frequency of said filter, a plurality of mechanically vibratory rod-shaped direct resonators each having a length that is substantially equal to D half wavelengths at the resonant frequency of said direct resonator, where D is any integer including unit, an equal plurality of mechanically vibratory rod-shaped contrary resonators each having a length that is substantially equal to (D+C) half wavelengths at the resonant frequency of said contrary resonator, where C is any odd integer including unity, each of said direct resonators and each of said contrary resonators being tuned to a different resonant frequency so that the resonant frequencies of said direct resonators alternate with the resonant frequencies of said contrary resonators, means for coupling one end of each of said direct resonators and one end of each of said contrary resonators to said input resonator along the length thereof at respective points thereon that are separated by a distance substantially equal to L half wavelengths at said midband frequency of said filter, where L is any integer including unity, and means for coupling the other end of each of said direct resonators and the other end of each of said contrary resonators to said output resonator along the length thereof at respective points thereon that are separated by a distance substantially equal to L half wavelengths at said midband frequency of said filter.

11. A mechanical filter, comprising a cylindrical input resonator, a cylindrical output resonator, said resonators being positioned substantially parallel to each other and each of said resonators being tuned to the midband frequency of said filter, a plurality of rod-shaped direct resonators each having a length that is substantially equal to D half wavelengths at the resonant frequency of said direct resonator, where D is any integer including unity, an equal plurality of rod-shaped contrary resonators each having a length that is substantially equal to (D+C) half wavelengths at the resonant frequency of said contrary resonator, where C is any odd integer including unity, each of said direct resonators and each of said contrary resonators being tuned to a different resonant frequency so that the resonant frequencies of said direct resonators alternate with the resonant frequencies of said contrary resonators, means for coupling one end of each of said direct resonators and one end of each of said contrary resonators to said input resonator along the length thereof at respective points thereon that are separated by a distance substantially equal to L half wavelengths at said midband frequency of said filter, where L is any integer including unity, means for coupling the other end of each of said direct resonators and the other end of each of said contrary resonators to said output resonator along the length thereof at respective points thereon that are separated by a distance substantially equal to L half wavelengths at said midband frequency of said filter, means coupled to said input resonator for exciting a mechanical vibration therein, and means coupled to said output resonator for detecting a mechanical vibration therein.

12. A mechanical filter, comprising at least two mechanically vibratory cylindrical resonators, a mechanically vibratory rod-shaped direct resonator having a length that is substantially equal to D half wavelengths at the resonant frequency of said direct resonator, where D is any integer including unity, a mechanically vibratory rod-shaped contrary resonator having a length that is substantially equal to (D+C) half wavelengths at the resonant frequency of said contrary resonator, where C is any odd integer including unity, and means for coupling said direct resonator and said contrary resonator in parallel between one end of one of said cylindrical resonators and one end of the other of said cylindrical resonators.

13. A mechanical filter, comprising a mechanically vibratory cylindrical input resonator, a mechanically vibratory cylindrical output resonator, each of said resonators being tuned to the midband frequency of said filter, a mechanically vibratory rod-shaped direct resonator having a length that is substantially equal to D half wavelengths at the resonant frequency of said direct resonator, where D is any integer including unity, a mechanically vibratory rod-shaped contrary resonator having a length that is substantially equal to (D+C) half wavelengths at the resonant frequency of said contrary resonator, where C is any odd integer including unity, said direct resonator and said contrary resonator being tuned to different resonant frequencies, means for coupling one end of said direct resonator and one end of said contrary resonator to said input resonator at one end thereof, and means for coupling the other end of said direct resonator and the other end of said contrary resonator to said output resonator at one end thereof.

14. A mechanical filter, comprising a mechanically vibratory cylindrical input resonator, a mechanically vibratory cylindrical output resonator, each of said resonators being tuned to the midband frequency of said filter, a mechanically vibratory rod-shaped direct resonator having a length that is substantially equal to D half wavelengths at the resonant frequency of said direct resonator, where D is any integer including unity, a mechanically vibratory rod-shaped contrary resonator having a length that is substantially equal to (D+C) half wavelengths at the resonant frequency of said contrary resonator, where C is any odd integer including unity, said direct resonator and said contrary resonator being tuned to a different resonant frequency, means for coupling one end of said direct resonator and one end of said contrary resonator to said input resonator at one end thereof, means for coupling the other end of said direct resonator and the other end of said contrary resonator to said output resonator at one end thereof, means coupled to said input resonator for exciting a mechanical vibration therein, and means coupled to said output resonator for detecting a mechanical vibration therein.

15. A mechanical filter, comprising a plurality of mechanically vibratory cylindrical resonators, each of said resonators being tuned to the mid-band frequency of said filter, a plurality of mechanically vibratory rod-shaped direct resonators each having a length that is substantially equal to D half wavelengths at the resonant frequency of said direct resonator, where D is any integer including unity, a plurality of mechanically vibratory rod-shaped contrary resonators each having a length that is substantially equal to (D+C) half wavelengths at the resonant frequency of said contrary resonator, where C is any odd integer including unity, means for coupling one of said direct resonators and one of said contrary resonators between one end of each of said cylindrical resonators and one end of the successive cylindrical resonator to form a chain of cylindrical resonators interconnected by said direct and said contrary resonators, means coupled to the first of said cylindrical resonators for exciting a mechanical vibration therein, and means coupled to the last of said cylindrical resonators for detecting a mechanical vibration therein.

16. A mechanical branching filter, comprising a mechanically vibratory common cylindrical resonator tuned to a mean frequency, a mechanically vibratory low frequency cylindrical resonator tuned to a frequency lower than said mean frequency, a mechanically vibratory high frequency cylindrical resonator tuned to a frequency higher than said mean frequency, at least one mechanically vibratory low frequency direct resonator having a length that is substantially equal to D half wavelengths at the resonant frequency of said low frequency direct resonator, where D is any integer including unity, at least one mechanically vibratory low frequency contrary resonator having a length that is substantially equal to (D+C) half wavelengths at the resonant frequency of said low frequency contrary resonator, where C is any odd integer including unity, means for coupling said low frequency direct resonator and said low frequency contrary resonator in parallel between said low frequency cylindrical resonator and said common cylindrical resonator along the lengths thereof at respective first points thereon that are separated by a distance substantially equal to L half wavelengths at said mean frequency, where L is any integer including unity, at least one mechanically vibratory high frequency direct resonator having a length that is substantially equal to D′ half wavelengths at the resonant frequency of said high frequency direct resonator, where D′ is any integer including unity, at least one mechanically vibratory high frequency contrary resonator having a length that is substantially equal to (D′+C′) half wavelengths at the resonant frequency of said high frequency contrary resonator, where C′ is any odd integer including unity, and means for coupling said high frequency direct resonator and said high frequency contrary resonator in parallel between said high frequency cylindrical resonator and said common cylindrical resonator along the lengths thereof at respective second points thereon that are separated by a distance substantially equal to L′ half wavelengths at said mean frequency, where L′ is any integer including unity, said adjacent first and second points being separated by a distance subtantially equal to L″ half wavelengths at said mean frequency, where L″ is any integer including unity.

References Cited in the file of this patent

UNITED STATES PATENTS

| | | |
|---|---|---|
| 2,738,467 | Roberts | Mar. 13, 1956 |
| 2,749,523 | Dishal | June 5, 1956 |
| 2,774,042 | Mason et al. | Dec. 11, 1956 |
| 2,777,999 | Hathaway | Jan. 15, 1957 |